May 24, 1927.
N. L. OLSON
1,630,210
REAR AXLE TRANSMISSION MECHANISM
Filed Oct. 6, 1924
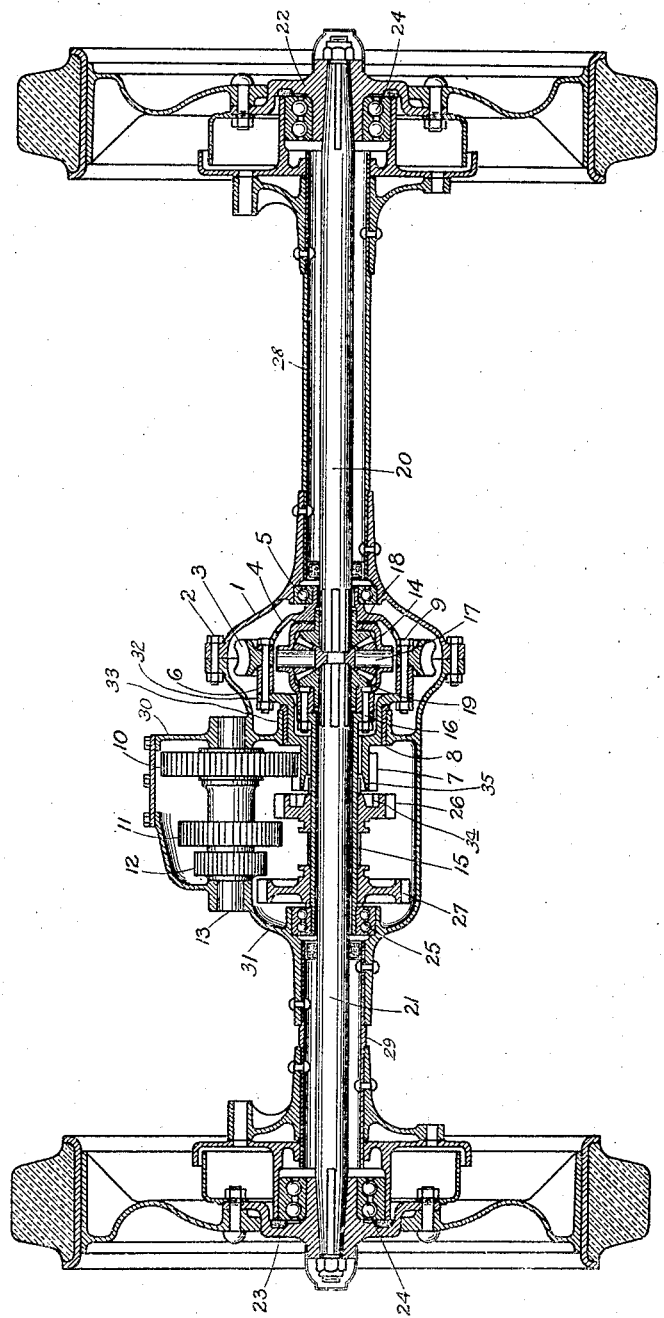
INVENTOR
Nels L. Olson,
BY
ATTORNEYS Patented May 24, 1927.

1,630,210

UNITED STATES PATENT OFFICE.

NELS L. OLSON, OF HIGHLAND PARK, MICHIGAN.

REAR-AXLE TRANSMISSION MECHANISM.

Application filed October 6, 1924. Serial No. 741,835.

This invention relates to a rear axle transmission adapted for automotive vehicles.

On account of an internal combustion engine developing its maximum power within a narrow range of speed it has been necessary to use a transmission in order to vary the speed of a vehicle without the necessity of throttling the engine. Ordinarily transmission mechanism is of the sliding type gear giving for the same motor speed different reductions at the vehicle wheels and is the common practice to locate the transmission mechanism immediately back of the engine. When the transmission is thus placed considerable stress is placed on the driving members between the transmission mechanism and the vehicle wheels, especially when driving at low speed, the stresses being proportionately to the reduction. The driving members usually include universal joints, propeller shaft, pinion, beveled gear, differential gears and axle shafts, all of which have to be strengthened to safely carry the maximum load. This is very pronounced when converting a pleasure vehicle into a commercial vehicle, that is, utilizing the power plant and part of the driving mechanism of a commercial vehicle having a chassis extension and heavy body. For instance, a truck body is often substituted for a pleasure body on a well known type of automobile, and when such truck body receives a heavy load the driving mechanisms, from the engine rearwardly, are subjected to severe stresses and strains.

The object of this invention is to include the transmission mechanism in the rear axle assembly of a motor driven vehicle, the transmission mechanism being associated with the usual differential mechanism at the rear axles, so that any reduction in speed will be as close to the axle shafts as it is possible to make the same. With the transmission mechanism located at the rear axle the parts of the transmission mechanism may be made comparatively light, obviating the necessity of reinforcing parts of the driving mechanism.

In locating the transmission mechanism at the rear axle assembly there is greater ease of lubrication, greater accessibility, and consequently a saving in labor and time incident to the assembling of the drive parts of the vehicle.

My invention will be hereinafter specifically described and then claimed, and reference will now be had to the drawing showing a horizontal section through the rear axle assembly of a worm driven vehicle.

In the drawing, the reference numerals 28 and 29 denote the parts of a rear axle housing and extending longitudinally of these housing parts are alining rear axles 20 and 21 which have the outer ends thereof with wheels 22 and 23 equipped with anti-frictional bearings 24 for supporting the outer ends of the housing parts 28 and 29.

Mounted on the inner ends of the housing parts 28 and 29 are the parts 1 and 31 of a combined differential and transmission casing, said casing parts being bolted together, as at 2. The differential casing part 1 is of the usual construction but the casing part 31 is materially enlarged so as to provide an off-set portion 30 in which is journaled a transmission shaft 13 provided with stepped transmission gears designated 10, 11 and 12.

In the inner end of the axle housing part 28 is an anti-frictional bearing 5 for the hollow hub portion 4 of a worm wheel 3 or any other type of wheel which may receive motion direct from a motor by means of a propeller shaft, worm or other power transmission device (not shown). Attached to the worm wheel 3 is a separator 6 and the flange 32 of a hollow hub member 8 journaled in a bearing 33 provided therefor in the outer casing part 31. The hub member 33 carries a transmission gear 7 constantly in mesh with the transmission gear 10 so as to transmit power from the worm wheel 3 to the shaft 13.

In the hollow hub portion 4 is the usual differential spider 17 and differential pinions and gears 18 and 19, said gears being respectively keyed to the inner ends of the axle shafts 20 and 21. The differential spider 17 is supported in an inner casing 14 to which is bolted, as at 16, a sleeve 15 and said sleeve has its opposite end journaled in an anti-frictional bearing 25 carried by the outer casing part 31. The sleeve 15 cooperates with the casing 14 in forming an inner rotatable differential casing, and slidably keyed on the sleeve 15 and adapted to rotate therewith are large speed gears 26 and 27. These gears may be shifted by any conventional form of mechanism (not shown). The large speed gear 26 has a side face thereof provided with a clutch member 34 adapted to interlock with a clutch member 35 forming part of the transmission gear 7.

For direct drive power is transmitted from the worm wheel 3 to the transmission gear, and with the large speed gear 26 shifted to interlock the clutch members 34 and 35, the sleeve 15 is driven and by virtue of the inner differential casing revolving the axle shafts 20 and 21 are driven by the differential gears. In other words, the worm wheel 3, transmission wheel 7, and connected parts constitute an outer casing and during direct drive the inner differential casing is driven at the same speed as the outer casing.

For second speed, the large speed gear 26 is shifted to disengage the clutch members and place said large speed gear in mesh with the transmission gear 11. This power is transmitted from the worm wheel 3 through the transmission gear wheels 7 and 10 to the axle 13 and by transmission gear wheels 11 and 26 to the sleeve 15 forming part of the inner differential casing. On account of the gear ratio the inner differential casing and axle shafts will be driven at a reduced speed, known as second speed.

To obtain first or low speed, the large speed gear 26 is left in a neutral position, as shown in the drawing, and the large speed gear 27 is shifted into mesh with the transmission gear 12. The drive from the worm wheel 3 is now through transmission gears 7 and 10, shaft 13, and gears 12 and 27 to the sleeve 15. Because of the difference in the size of the gears 12 and 27 and the gears 7 and 10 there are two reductions, consequently the inner differential casing is driven at a much lower speed than the outer differential casing.

When the large speed gears 26 and 27 are in the positions shown in the drawing there is a neutral condition, no drive and the transmission may be said to be in neutral.

It is obvious that by the addition of other stepped gears on the shaft 13 there may be more reduction or a variety of speeds, and that by introducing an idler shaft and gear there may be a reverse speed condition.

From the foregoing it will be noted that with the transmission mechanism located at the rear axle assembly the usual universal joints, propeller shaft and beveled gears constituting the drive mechanism from an engine to the rear axle, can be made of lighter materials than would be necessary otherwise, and for heavy duty commercial vehicles it is only necessary to strengthen differential gears and axle shafts.

The casing parts 1 and 31 cooperate with the housing parts 28 and 29 in forming a rigid rear axle housing and it is obvious that easy access may be had to the interior of the casing parts 1 and 31 for lubricating purposes. Access may be readily had to the transmission mechanism and there is ample support at the rear axle assembly for any gear shifting mechanism used in connection with the large speed gears.

One embodiment of my invention has been illustrated but it is to be understood that the structural elements are susceptible to such variations and modifications as fall within the scope of the appended claim.

What I claim is:—

In a rear axle housing, alining axle shafts, a differential mechanism at the confronting ends of said shafts, a sleeve about one of said shafts connected to said differential mechanism and adapted to transmit power to said differential mechanism, a worm wheel, a transmission gear having a hollow hub journaled in said housing and connected to said worm wheel, the hollow hub of said transmission gear providing clearance for the connection between said transmission gear and said differential mechanism and a shiftable gear on said sleeve adapted to engage said transmission gear for direct drive of said differential mechanism and said axle shafts by said worm wheel.

In testimony whereof I affix my signature.

NELS L. OLSON.